United States Patent
Branyon et al.

(10) Patent No.: US 8,807,099 B2
(45) Date of Patent: Aug. 19, 2014

(54) TURBOCHARGED DOWNSIZED COMPRESSION CYLINDER FOR A SPLIT-CYCLE ENGINE

(75) Inventors: David P. Branyon, San Antonio, TX (US); Kevin L. Hoag, Madison, WI (US); Salvatore C. Scuderi, Westfield, MA (US)

(73) Assignee: Scuderi Group, LLC, West Springfield, MA (US)

( * ) Notice: Subject to any disclaimer, the term of this patent is extended or adjusted under 35 U.S.C. 154(b) by 301 days.

(21) Appl. No.: 13/239,917

(22) Filed: Sep. 22, 2011

(65) Prior Publication Data

US 2012/0073551 A1 Mar. 29, 2012

Related U.S. Application Data

(60) Provisional application No. 61/386,086, filed on Sep. 24, 2010, provisional application No. 61/386,605, filed on Sep. 27, 2010, provisional application No. 61/436,300, filed on Jan. 26, 2011, provisional application No. 61/470,566, filed on Apr. 1, 2011, provisional application No. 61/501,368, filed on Jun. 27, 2011.

(51) Int. Cl.
   *F02B 75/18* (2006.01)

(52) U.S. Cl.
   USPC .................................. 123/70 R; 123/68

(58) Field of Classification Search
   USPC ...................................... 123/70 R
   See application file for complete search history.

(56) References Cited

U.S. PATENT DOCUMENTS

| | | | |
|---|---|---|---|
| 4,418,657 A | 12/1983 | Wishart | |
| 5,325,824 A | 7/1994 | Wishart | |
| 6,543,225 B2 | 4/2003 | Scuderi | |
| 6,952,923 B2 | 10/2005 | Branyon et al. | |
| 7,513,224 B2 | 4/2009 | Heaton | |
| 2009/0038597 A1 | 2/2009 | Phillips | |
| 2010/0095927 A1 | 4/2010 | Salminen | |
| 2010/0116241 A1 | 5/2010 | Mistry | |

FOREIGN PATENT DOCUMENTS

| | | |
|---|---|---|
| GB | 2413361 | 10/2005 |
| JP | 2006-97692 | 4/2006 |
| JP | 2007-521439 | 8/2007 |
| JP | 2010-529366 | 8/2010 |
| TW | 1248493 | 2/2006 |
| TW | 200728597 | 8/2007 |
| TW | 200946768 | 11/2009 |

OTHER PUBLICATIONS

Office Action in JP 2013-516861 dated Nov. 26, 2013 and English translation.
Taiwanese office action dated Jun. 27, 2013 in Taiwanese patent application No. 100134392 and English translation.

*Primary Examiner* — Noah Kamen
(74) *Attorney, Agent, or Firm* — Fildes & Outland, P.C.

(57) ABSTRACT

A split-cycle engine includes an expander, the expander including an expansion piston received within an expansion cylinder. A compressor includes a compression piston received within a compression cylinder. A crossover passage interconnects the compression and expansion cylinders. An intake manifold is connected to the compression cylinder. A boosting device providing a 1.7 bar absolute or greater boost pressure level is connected to the intake manifold. An intake valve is disposed between the intake manifold and the compression cylinder. The intake valve closing is timed to provide a compressor volumetric efficiency of 0.75 or greater. A compressor displacement volume is sized relative to an expander displacement volume such that the combination of compressor displacement volume and boost pressure level provides an expander volumetric efficiency relative to ambient conditions that is 0.90 or greater.

32 Claims, 11 Drawing Sheets

Miller Cycle with Late IVC

Miller Cycle with Early IVC

Miller Cycle: 1400 to 4000 rpm: less than 3 bar absolute boost: full load: BMEP and Cylinder Pressure Curves

TURBOCHARGED DOWNSIZED COMPRESSION CYLINDER FOR A SPLIT-CYCLE ENGINE

CROSS-REFERENCE TO RELATED APPLICATIONS

This application claims the priority of U.S. Provisional Application No. 61/386,086 filed Sep. 24, 2010, U.S. Provisional Application No. 61/386,605 filed Sep. 27, 2010, U.S. Provisional Application No. 61/436,300 filed Jan. 26, 2011, U.S. Provisional Application No. 61/470,566, filed Apr. 1, 2011, and U.S. Provisional Application No. 61/501,368, filed Jun. 27, 2011.

TECHNICAL FIELD

The present invention relates to internal combustion engines. More specifically, the present invention relates to a turbocharged split-cycle engine that divides the four strokes of a conventional Otto cycle over two paired cylinders, one intake/compression cylinder (compressor) and one power/exhaust cylinder (expander), connected by a crossover port, with each of the four strokes being completed in one revolution of the crankshaft.

BACKGROUND OF THE INVENTION

For purposes of clarity, the term "conventional engine" as used in the present application refers to an internal combustion engine wherein all four strokes of the well-known Otto cycle (the intake, compression, expansion (or power) and exhaust strokes) are contained in each piston/cylinder combination of the engine. Each stroke requires one half revolution of the crankshaft (180 degrees crank angle (CA)), and two full revolutions of the crankshaft (720 degrees CA) are required to complete the entire Otto cycle in each cylinder of a conventional engine.

Also, for purposes of clarity, the following definition is offered for the term "split-cycle engine" as may be applied to engines disclosed in the prior art and as referred to in the present application.

A split-cycle engine comprises:
a crankshaft rotatable about a crankshaft axis;
a compressor including a compression piston slidably received within a compression cylinder and operatively connected to the crankshaft such that the compression piston reciprocates through an intake stroke and a compression stroke during a single rotation of the crankshaft;
an expander including an expansion (power) piston slidably received within an expansion cylinder and operatively connected to the crankshaft such that the expansion piston reciprocates through an expansion stroke and an exhaust stroke during a single rotation of the crankshaft; and
a crossover passage interconnecting the compression and expansion cylinders, the crossover passage including at least a crossover expansion (XovrE) valve disposed therein, but more preferably including a crossover compression (XovrC) valve and a crossover expansion (XovrE) valve defining a pressure chamber therebetween.

U.S. Pat. No. 6,543,225 granted Apr. 8, 2003 to Carmelo J. Scuderi (the Scuderi patent) and U.S. Pat. No. 6,952,923 granted Oct. 11, 2005 to David P. Branyon et al. (the Branyon patent) each contains an extensive discussion of split-cycle and similar type engines. In addition, the Scuderi and Branyon patents disclose details of prior versions of engines of which the present invention comprises a further development. Both the Scuderi patent and the Branyon patent are incorporated herein by reference in their entirety.

Referring to FIG. 1, a prior art exemplary embodiment of a split-cycle engine of the type similar to those described in the Branyon and Scuderi patents is shown generally by numeral 10. The split-cycle engine 10 replaces two adjacent cylinders of a conventional engine with a combination of one compression cylinder 12 and one expansion cylinder 14. A cylinder head 33 is typically disposed over an open end of the expansion and compression cylinders 12, 14 to cover and seal the cylinders.

The four strokes of the Otto cycle are "split" over the two cylinders 12 and 14 such that the compression cylinder 12, together with its associated compression piston 20, perform the intake and compression strokes (the compression cylinder 12 and piston 20 collectively being referred to as the compressor (12, 20)), and the expansion cylinder 14, together with its associated expansion piston 30, perform the expansion and exhaust strokes (the expansion cylinder 14 and piston 30 collectively being referred to as the expander (14, 30)). The Otto cycle is therefore completed in these two cylinders 12, 14 once per crankshaft 16 revolution (360 degrees CA) about crankshaft axis 17.

During the intake stroke, intake air is drawn into the compression cylinder 12 through an intake manifold (port) 19 disposed in the cylinder head 33. An inwardly opening (opening inward into the cylinder and toward the piston) poppet intake valve 18 controls fluid communication between the intake manifold 19 and the compression cylinder 12. The intake air is approximately at atmospheric pressure in the intake manifold.

During the compression stroke, the compression piston 20 pressurizes the air charge and, upon XovrC opening, drives the air charge into the crossover passage (or port) 22, which is typically disposed in the cylinder head 33. This means that the compression cylinder 12 and compression piston 20 are a source of high pressure gas to the crossover passage 22, which acts as the intake passage for the expansion cylinder 14. In some embodiments, two or more crossover passages 22 interconnect the compression cylinder 12 and the expansion cylinder 14.

The volumetric (or geometric) compression ratio of the compression cylinder 12 of split-cycle engine 10 (and for split-cycle engines in general) is herein referred to as the "compression ratio" of the split-cycle engine. The volumetric (or geometric) compression ratio of the expansion cylinder 14 of split-cycle engine 10 (and for split-cycle engines in general) is herein referred to as the "expansion ratio" of the split-cycle engine. The compression ratio of a cylinder is well known in the art as the ratio of the enclosed (or trapped) volume in the cylinder (including all recesses) when a piston reciprocating therein is at its bottom dead center (BDC) position to the enclosed volume (i.e., clearance volume) in the cylinder when the piston is at its top dead center (TDC) position. Specifically for split-cycle engines as defined herein, the volume of the crossover passage(s) is not included in the determination of the compression ratio of a compression cylinder. Also, specifically for split-cycle engines as defined herein, the volume of the crossover passage(s) is not included in the determination of the expansion ratio of an expansion cylinder.

Due to very high compression ratios (e.g., 20 to 1, 30 to 1, 40 to 1, or greater), an outwardly opening (opening outward away from the cylinder and piston) poppet crossover compression (XovrC) valve 24 at the crossover passage inlet 25 is used to control flow from the compression cylinder 12 into the crossover passage 22. Due to very high expansion ratios (e.g., 20 to 1, 30 to 1, 40 to 1, or greater), an outwardly opening poppet crossover expansion (XovrE) valve 26 at the outlet 27 of the crossover passage 22 controls flow from the crossover passage into the expansion cylinder 14. The actuation rates and phasing of the XovrC and XovrE valves 24, are timed to maintain pressure in the crossover passage 22 at a high minimum pressure (typically 20 bar absolute or higher, e.g., 40 to 50 bar, during full load operation) during all four strokes of the Otto cycle.

At least one fuel injector 28 injects fuel into the pressurized air at the exit end of the crossover passage 22 in correspondence with the XovrE valve 26 opening, which occurs shortly before expansion piston 30 reaches its top dead center position. At this time, the pressure ratio of the pressure in crossover passage 22 to the pressure in expansion cylinder 14 is high, due to the fact that the minimum pressure in the crossover passage is typically 20 bar absolute or higher at full engine load and the pressure in the expansion cylinder during the exhaust stroke is typically about one to two bar absolute. In other words, when XovrE valve 26 opens, the pressure in crossover passage 22 is substantially higher than the pressure in expansion cylinder 14 (typically in the order of 20 to 1 or greater at full engine load). This high pressure ratio causes initial flow of the air and/or fuel charge to flow into expansion cylinder 14 at high speeds. These high flow speeds can reach the speed of sound, which is referred to as sonic flow. The air/fuel charge usually enters the expansion cylinder 14 shortly after expansion piston 30 reaches its top dead center position (TDC), although it may begin entering slightly before TDC under some operating conditions. As piston 30 begins its descent from its top dead center position, and while the XovrE valve 26 is still open, spark plug 32, which includes a spark plug tip 39 that protrudes into cylinder 14, is fired to initiate combustion in the region around the spark plug tip 39. Combustion can be initiated while the expansion piston is between 1 and 30 degrees CA past its top dead center (TDC) position. More preferably, combustion can be initiated while the expansion piston is between 5 and 25 degrees CA past its top dead center (TDC) position. Most preferably, combustion can be initiated while the expansion piston is between 10 and 20 degrees CA past its top dead center (TDC) position. Additionally, combustion may be initiated through other ignition devices and/or methods, such as with glow plugs, microwave ignition devices or through compression ignition methods. The sonic flow of the air/fuel charge is particularly advantageous to split-cycle engine 10 because it causes a rapid combustion event, which enables the split-cycle engine 10 to maintain high combustion pressures even though ignition is initiated while the expansion piston 30 is descending from its top dead center position.

The XovrE valve 26 is closed after combustion is initiated but before the resulting combustion event can enter the crossover passage 22. The combustion event drives the expansion piston 30 downward in a power stroke.

During the exhaust stroke, exhaust gases are pumped out of the expansion cylinder 14 through exhaust port 35 disposed in cylinder head 33. An inwardly opening poppet exhaust valve 34, disposed in the inlet 31 of the exhaust port 35, controls fluid communication between the expansion cylinder 14 and the exhaust port 35.

Typically, in a naturally aspirated split-cycle engine such as that shown in FIG. 1, the compression cylinder displacement volume (Vd) required to intake a given charge (or mass) of air is larger than the required displacement volume of a cylinder of a conventional engine for the same charge of air. The compression cylinder of a naturally aspirated split-cycle engine must be made larger because during engine operation there is always a trapped compressed air mass present in the compression cylinder at the end of the compression stroke. Therefore, during the subsequent intake stroke immediately following the compression stroke, intake air cannot be drawn into the compression cylinder until the compression piston drops down far enough from top dead center so that the pressure of the trapped air mass is equal to atmospheric pressure. Thus, part of the volume swept by the compression cylinder during the intake stroke is not utilized for air intake. Hence, the compression cylinder must be made larger so that it has sufficient volume to draw a necessary amount of intake air during the remainder of the intake stroke. This increase in displaced volume decreases the power density of a typical naturally aspirated split-cycle engine, the power density (or specific power) being defined as the brake power per engine displacement, usually expressed as kilowatts/liter or horsepower/liter.

It is also known in the art of internal combustion engines to operate a conventional engine using the Miller cycle. The efficiency of an internal combustion engine is increased if the gas is expanded more during the expansion stroke than it is compressed during the compression stroke. In the Miller cycle of a conventional engine, this is typically accomplished by early or late inlet valve closing (IVC), which decreases the effective compression ratio relative to the expansion ratio. For example, if the inlet valve of a conventional engine is closed late (i.e., during the compression stroke that follows the intake stroke), a portion of the intake air that was drawn into the cylinder during the intake stroke is pushed back out of the cylinder through the intake port. The intake valve may be kept open during about the first 20 percent of the compression stroke. Therefore, actual compression only occurs in about the last 80 percent of the compression stroke.

Referring to FIG. 2A, an exemplary embodiment of a pressure vs. volume (PV) diagram of a naturally aspirated engine utilizing late IVC to effect Miller cycle operation is shown. Though this embodiment depicts a naturally aspirated engine, it is know that the same principles apply to turbocharged engines as well.

As shown in FIG. 2A, during the intake stroke of the piston from TDC to BDC, the cylinder pressure follows a constant pressure line from point 6 through point 1 and finally to point 5. During the initial portion of the subsequent compression stroke, while the intake valve is left open the cylinder pressure retraces the pressure line from point 5 back to point 1. Then, at point 1 the intake valve closes and the cylinder pressure increases from point 1 to point 2 during the remainder of the compression stroke. The volume swept by the piston along the path 1-5 is canceled by the volume swept along the path 5-1, and the effective compression ratio is the volume at point 1 divided by the volume at point 2 rather than the volume at point 5 divided by the volume at point 2 for the Otto cycle.

Referring to FIG. 2B, the same effect can be achieved in the Miller cycle by early inlet valve closing. In this case, the pressure remains constant during the intake stroke from point 6 to point 1. Then at point 1 the intake valve closes, and the pressure in the cylinder decreases from point 1 to point 7. During the subsequent compression stroke, the pressure increases from point 7 to point 1, canceling the previously traced path, and continues to point 2 during the remainder of the compression stroke. The net result is the same as late intake valve closing. That is, less than the entire piston stroke is effectively used for compression, thereby decreasing the effective compression ratio for increased efficiency while also decreasing the mass of charge air per cycle.

The increase in efficiency of the Miller cycle (typically 10 to 15 percent greater than the Otto cycle) is negatively offset by a decrease in indicated mean effective pressure (IMEP) and power density that is a result of a loss of charge air because only part of the total displaced volume in the cylinder is filled with charge air (i.e., displacement volume is sacrificed). Accordingly, to achieve the same amount of power as an Otto cycle engine, a Miller cycle engine typically must be made larger, or boosted, or boosted more aggressively.

Additionally, the later or earlier IVC occurs, the faster the piston is traveling and, therefore, the faster the air is flowing over the intake valve when it closes. This leads to significant pumping loses, which greatly reduces engine efficiency (i.e, brake specific fuel consumption (BSFC)) of conventional Miller cycle engines.

SUMMARY OF THE INVENTION

The Scuderi engine is a split-cycle design that divides the four strokes of a conventional Otto cycle over (in its simplest configuration) a compressor and expander pair. The compressor includes at least one compression cylinder and associated compression piston, which reciprocates through the intake and compression strokes. The expander includes at least one expansion cylinder and associated expansion piston, which reciprocates through the expansion (or power) and exhaust strokes. The expander and compressor are connected by a crossover passage.

Miller cycle operation of any reciprocating internal combustion engine (RICE), whether the RICE is split-cycle or conventional, necessitates the engine to be configured such that the gas is expanded more during the expansion stroke than it is compressed during the compression stroke. Accordingly, gas will be over-expanded during the expansion stroke, resulting in an increase in efficiency (i.e., a decrease in brake specific fuel consumption (BSFC)). In a conventional RICE, Miller operation is typically accomplished through early or late intake valve closing (IVC). However, in a split-cycle engine, Miller cycle operation may be achieved by physically reducing the compressor displacement relative to the expander displacement.

A Miller cycle configuration of the split-cycle engine was constructed with a turbocharged intake manifold connected to a downsized split-cycle engine's compressor relative to the split-cycle engine's expander, and has been modeled in 1-dimensional cycle simulation software. Several positive interactions were found between the split-cycle engine and Miller cycle operating principles. Namely:

1. Downsizing the compressor relative to the expander to achieve Miller operation in a split-cycle engine does not waste part of the compressor's displacement to achieve the reduced compression. Contrarily, in order to configure a conventional RICE for Miller operation at full load, its cylinders must be sized for the full displacement of its expansion stroke and part of that displacement must necessarily be wasted to accommodate early or late IVC during the compression stroke. The reduction of the compressor displacement on the split-cycle engine provides a generally higher brake mean effective pressure (BMEP) compared to a conventional RICE with Miller cycle operation.

2. Reduction of the compressor displacement allows Miller cycle operation while still closing the intake valve at or near an optimum trapped mass condition (i.e., optimum volumetric efficiency). This results in reduced pumping work compared to the Miller cycle applied to a conventional RICE, due to the avoidance of closing the intake valve during a period of high piston (and therefore air) velocity.

3. Whether the RICE is split-cycle or conventional, the magnitude of the Miller factor (i.e., ratio of gas expansion during the expansion stroke to gas compression during the compression stroke) determines the level of compression work load that is shifted from the split-cycle engine's compressor to the turbocharger compressor. Since the turbo compressor is driven by the exhaust gases via the turbine, it compresses at a lower "cost" in terms of crankshaft energy, providing for a net increase in work delivered to the crankshaft. With aftercooling, this also allows cooling later in the overall compression process, resulting in a lower end-of-compression temperature for the same pressure. The knock suppressing aspect of the lower end-of-compression temperature allows for increasing compression pressures at more aggressive Miller factors, resulting in higher total air and fuel flow, and hence power. The previously mentioned split-cycle's ability to utilize more aggressive Miller factor operation than conventional RICEs allows the split-cycle engine to take greater advantage of these characteristics of the Miller cycle.

4. For a given boost level, within the operating constraints used by the engine (i.e., knock fraction, peak expander cylinder pressure or the like), the split-cycle engine is most efficient when volumetric efficiency of both the compressor and expander are at or near optimum. Typically, the volumetric efficiency of the compressor is measured relative to intake manifold conditions and should be at least 0.75, more preferably at least 0.8, even more preferably at least 0.85, and most preferably at least 0.9. Typically, the volumetric efficiency of the expander is measured relative to ambient conditions and should be at least 0.90, more preferably at least 1.0, even more preferably at least 1.1, and most preferably at least 1.2.

More particularly, in an exemplary embodiment of the invention a split-cycle engine includes a crankshaft rotatable about a crankshaft axis and an expander having an expander displacement volume. The expander includes an expansion piston slidably received within an expansion cylinder and operatively connected to the crankshaft such that the expansion piston reciprocates through an expansion stroke and an exhaust stroke during a single rotation of the crankshaft. The split-cycle engine also includes a compressor having a compressor displacement volume that is 90 percent or less than the expander displacement volume. The compressor includes a compression piston slidably received within a compression cylinder and operatively connected to the crankshaft such that the compression piston reciprocates through an intake stroke and a compression stroke during a single rotation of the crankshaft. A crossover passage interconnects the compression cylinder and the expansion cylinder. The crossover passage includes at least a crossover expansion valve disposed therein. An intake manifold connects to the compression cylinder. A boosting device is connected to the intake manifold and is operable to provide a 1.7 bar absolute or greater boost pressure level to the intake manifold. An intake valve is disposed between the intake manifold and the compression cylinder and is operable to control fluid communication therebetween. The intake valve has an intake valve closing event which is timed to provide a compression cylinder volumetric efficiency relative to intake manifold conditions of 0.75 or greater. The compressor displacement volume is sized relative to the expander displacement volume such that the combination of compressor displacement volume and boost pressure level provide an expander volumetric efficiency relative to ambient conditions that is 0.90 or greater.

The boost operating device may be a turbocharger. The compressor may include a plurality of compression cylinders, and the expander may include a plurality of expansion cylinders. The split-cycle engine may also include a crossover compression valve disposed in the crossover passage, wherein the crossover compression valve and the crossover expansion valve form a pressure chamber therebetween.

The compressor displacement volume may be 80 percent or less, 75 percent or less, or even 70 percent or less than the expander displacement volume. The boosting device may be operable to provide boost pressure levels of 2.0 bar absolute or greater, 2.3 bar absolute or greater, or even 2.5 bar absolute or greater. The compressor volumetric efficiency relative to intake manifold conditions may be 0.80 or greater, 0.85 or greater, or even 0.90 or greater, while the expander volumetric efficiency relative to ambient conditions may be 1.0 or greater, 1.1 or greater, or even 1.2 or greater.

A method of operating a split-cycle engine is also disclosed. The split-cycle engine includes a crankshaft rotatable about a crankshaft axis and an expander having an expander displacement volume. The expander includes an expansion piston slidably received within an expansion cylinder and operatively connected to the crankshaft such that the expansion piston reciprocates through an expansion stroke and an exhaust stroke during a single rotation of the crankshaft. The split-cycle engine also includes a compressor having a compressor displacement volume. The compressor includes a compression piston slidably received within a compression cylinder and operatively connected to the crankshaft such that the compression piston reciprocates through an intake stroke and a compression stroke during a single rotation of the crankshaft. A crossover passage interconnects the compression cylinder and the expansion cylinder. The crossover passage includes at least a crossover expansion valve disposed therein. An intake manifold connects to the compression cylinder. A boosting device is connected to the intake manifold and is operable to provide a boost pressure level to the intake manifold. An intake valve is disposed between the intake manifold and the compression cylinder and is operable to control fluid communication therebetween. The method in accordance with the present invention includes the following steps: sizing the compressor displacement volume to be 90 percent or less than the expander displacement volume; delivering a 1.7 bar absolute or greater boost pressure level to the intake manifold from the boosting device; timing the closing of the intake valve such that a compressor volumetric efficiency relative to intake manifold conditions is 0.75 or greater; and sizing the compressor displacement volume relative to the expander displacement volume such that the combination of compressor displacement volume and boost pressure level provide an expander volumetric efficiency relative to ambient conditions of 0.90 or greater.

These and other features and advantages of the invention will be more fully understood from the following detailed description of the invention taken together with the accompanying drawings.

DETAILED DESCRIPTION OF THE INVENTION

Figure 1:
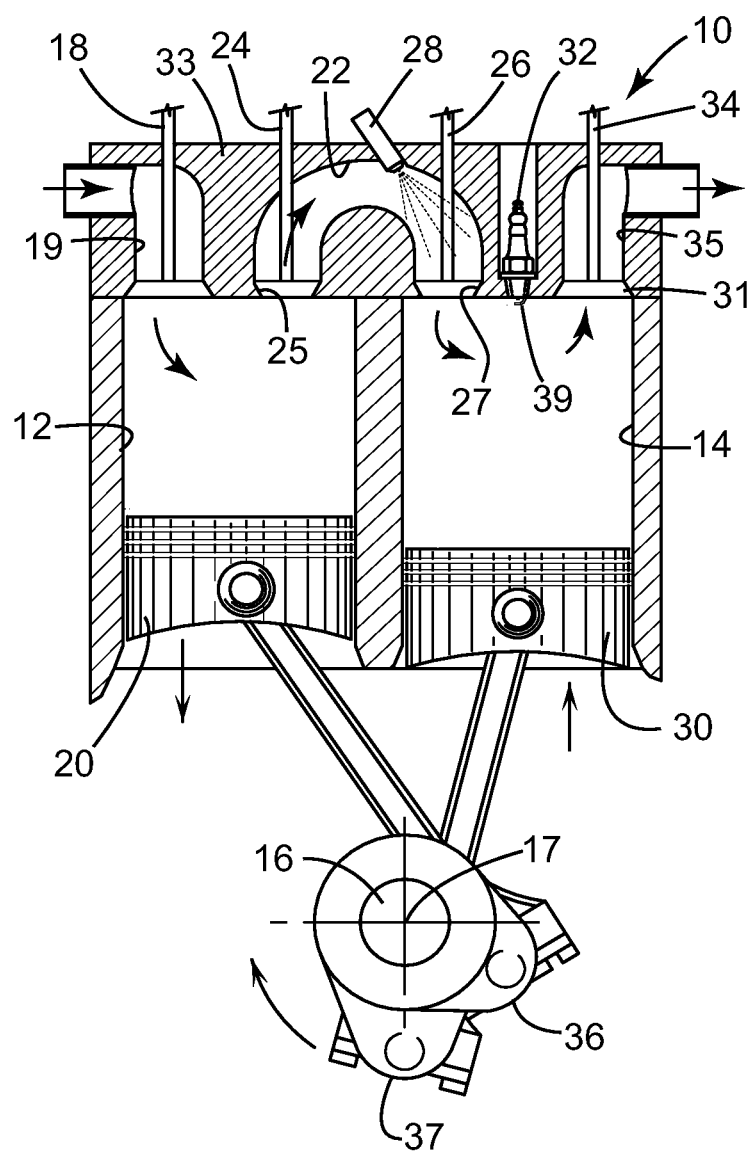
FIG. 1 is a cross-sectional view of a prior art split-cycle engine.
Figure 2A:
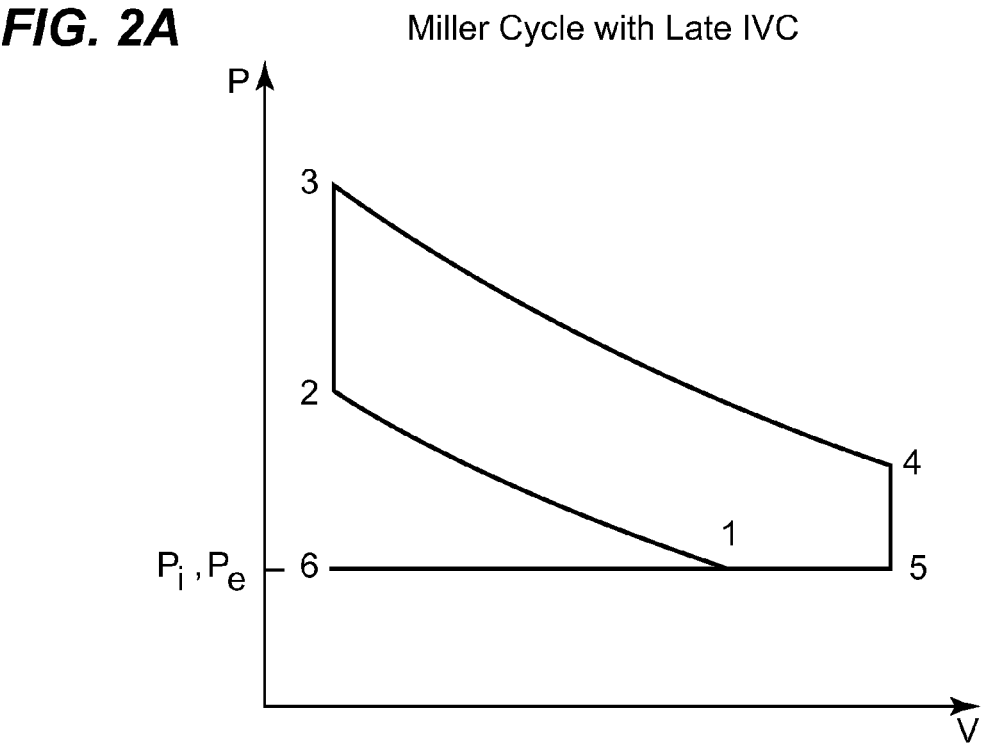
FIG. 2 is a graphical illustration of a prior art pressure vs. volume diagram for a conventional engine Miller cycle implemented with early and late intake valve closing.
Figure 2B:
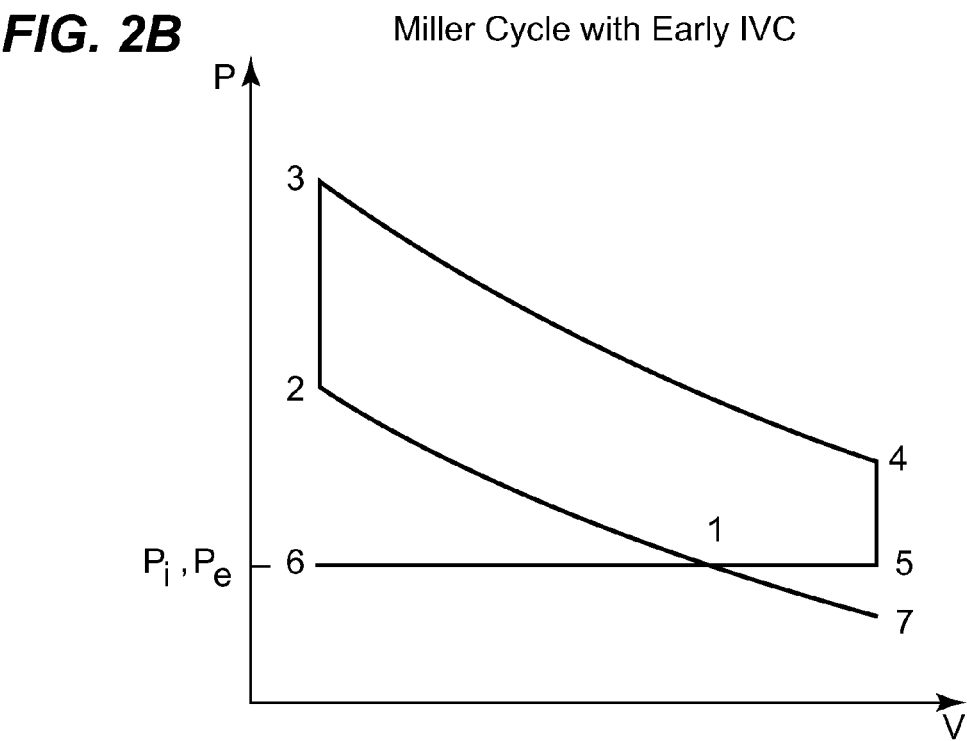

The following glossary of definitions of acronyms and terms used herein is provided for reference and clarity.
Bar: Unit of pressure, 1 bar=$10^5$ N/m$^2$.
Bar-abs (Bar-absolute): Pressure referenced to a complete vacuum, i.e., standard atmospheric pressure equals 1.013 bar-absolute.
BMEP: Brake mean effective pressure. The term "Brake" refers to the output as delivered to the crankshaft (or output shaft), after friction and parasitic losses (FMEP) are accounted for. Brake Mean Effective Pressure (BMEP) is the engine's brake torque output expressed in terms of a mean effective pressure (MEP) value. BMEP is proportional to the brake torque divided by engine displacement. This is the performance parameter taken after the losses due to friction. Accordingly, BMEP=IMEP−FMEP. Friction, in this case is usually also expressed in terms of an MEP value known as Friction Mean Effective Pressure (or FMEP). In this definition, a typical friction value (loss) would be a positive value of FMEP; in other words, a positive FMEP would be a net reduction of work provided to the crankshaft.
Boost or Boost Pressure Level: Intake manifold pressure from a boosting device, such as a turbocharger, in bar-absolute.
Brake Specific Fuel Consumption (BSFC): A measure of fuel efficiency within a reciprocating engine. It is the rate of fuel consumption divided by the brake power produced and is typically expressed in units of grams per kilowatt-hour (g/(kW·h)). BSFC may also be thought of as power-specific fuel consumption.
Compressor of a split-cycle engine: The total number of compression cylinders and associated pistons providing compressed air to at least one common expansion cylinder during a compression stroke for an operating cycle of a split-cycle engine. Typically, a compressor of a split-cycle engine includes a single compression cylinder and its associated compression piston. However, it is possible for a compressor to include a plurality of compression cylinders and pistons.

Compressor displacement volume of a split-cycle engine: The total combined displacement volume (Vd) of each compression cylinder of a compressor.

Displacement volume of a cylinder (Vd), conventional or split-cycle: The volume displaced by a piston within a cylinder of an engine as the piston travels from its bottom dead center position to its top dead center position.

Effective compression ratio of a conventional engine: The ratio of the volume within a cylinder of a conventional engine when the cylinder's piston is at its intake valve closing position to the volume within the cylinder when the cylinder's piston is at its top dead center position.

Expander of a split-cycle engine: The total number of expansion cylinders and associated pistons receiving compressed air from at least one common compression cylinder during an expansion stroke for an operating cycle of a split-cycle engine. Typically, an expander of a split-cycle engine includes a single expansion cylinder and its associated expansion piston. However, it is possible for an expander to include a plurality of expansion cylinders and pistons.

Expander displacement volume of a split-cycle engine: The total combined displacement volume (Vd) of each expansion cylinder of an expander.

FMEP: Friction mean effective pressure. Theoretical mean effective pressure required to overcome engine friction plus parasitic losses. Can be thought of as mean effective pressure lost due to friction. Sign convention for this discussion is that a friction loss is a positive FMEP value.

Full (100%) Engine Load: The maximum torque that an engine can produce at a given speed.

Geometric compression ratio of a conventional engine: The ratio of volume within a cylinder of a conventional engine when the cylinder's piston is at its bottom dead center position to the volume within the cylinder when the cylinder's piston is at its top dead center position.

Geometric expansion ratio of a conventional engine: For a conventional engine, wherein the compression and expansion strokes are contained within the same cylinder, the compression ratio and the expansion ratio are identical.

Indicated: Refers to the output as delivered to the top of the piston, before friction losses are accounted for.

Indicated Mean Effective Pressure (IMEP): Mean effective pressure calculated from in-cylinder pressure. IMEP is the integration of the area inside the P-V curve, which is also proportional to the indicated engine torque divided by displacement volume. In fact, all indicated torque and power values are derivatives of this parameter.

IVC: Intake valve closing or intake valve closing event. The timing of the closing of the intake valve relative to bottom dead center (BDC) of the compression piston. Early intake valve closing is the closing of the intake valve before BDC and late intake valve closing is the closing of the intake valve after BDC.

Knock: The tendency of an air/fuel mixture to self-ignite during compression.

Knock Fraction (also commonly referred to as Knock Index or Knock Margin or Knock Number): A predicted parameter which provides a relative indication of the tendency of a particular air/fuel mixture to reach self-ignition during compression. Self-ignition is usually denoted by a knock value fraction of 1 while no tendency to self-ignite is usually denoted by a knock fraction of zero. For example, a knock fraction of 0.8 indicates that the physical and chemical conditions prerequisite for self-ignition have reached 80% of the value required to generate self-ignition.

mm: Millimeter.

Parasitic Losses: Energy losses incurred by an engine to operate accessories and ancillary devices. This includes energy to drive items such as pumps and electricity generating devices. The brake output of an engine is reduced by these losses.

Power Density (or Specific Power): Brake power (power generated at the crankshaft) per engine displacement, usually expressed as kilowatts/liter or horsepower/liter.

RICE: Reciprocating internal combustion engine. Any engine having reciprocating pistons and an internal combustion process. May be either a conventional engine or a split-cycle engine.

RPM: Revolutions per minute.

Split-Cycle Engine Displacement Volume: The sum of the compressor and expander displacement volumes of the split-cycle engine.

Turbo: Turbocharger.

Volumetric Efficiency of a cylinder, conventional or split-cycle: Abbreviated Vol_Eff. The ratio of the actual mass of air trapped in the cylinder during the closed portion of the cycle, compared to the theoretical mass of air that would be trapped in the cylinder's displaced volume if it were filled with air of the same pressure and temperature as the reference location. The reference location is typically either ambient (i.e., air at atmospheric temperature and pressure) or intake manifold conditions (air at intake manifold temperature and pressure). Volumetric Efficiency may be defined by the following equation: $Vol\_Eff = ma/(da*Vd)$, where ma is the mass of air trapped in the cylinder per cycle, da is the density of air at the reference state, and Vd is the cylinder displacement volume as defined herein.

Volumetric Efficiency of a compressor of a split-cycle engine: The ratio of the actual mass of air trapped in the compressor during the closed portion of the cycle, compared to the theoretical mass of air that would be trapped in the compressor's displaced volume if it were filled with air of the same pressure and temperature as the reference location.

Volumetric Efficiency of an expander of a split-cycle engine: The ratio of the actual mass of air trapped in the expander during the closed portion of the cycle, compared to the theoretical mass of air that would be trapped in the expander's displaced volume if it were filled with air of the same pressure and temperature as the reference location.

Xover (Xovr): Crossover.

Figure 3:
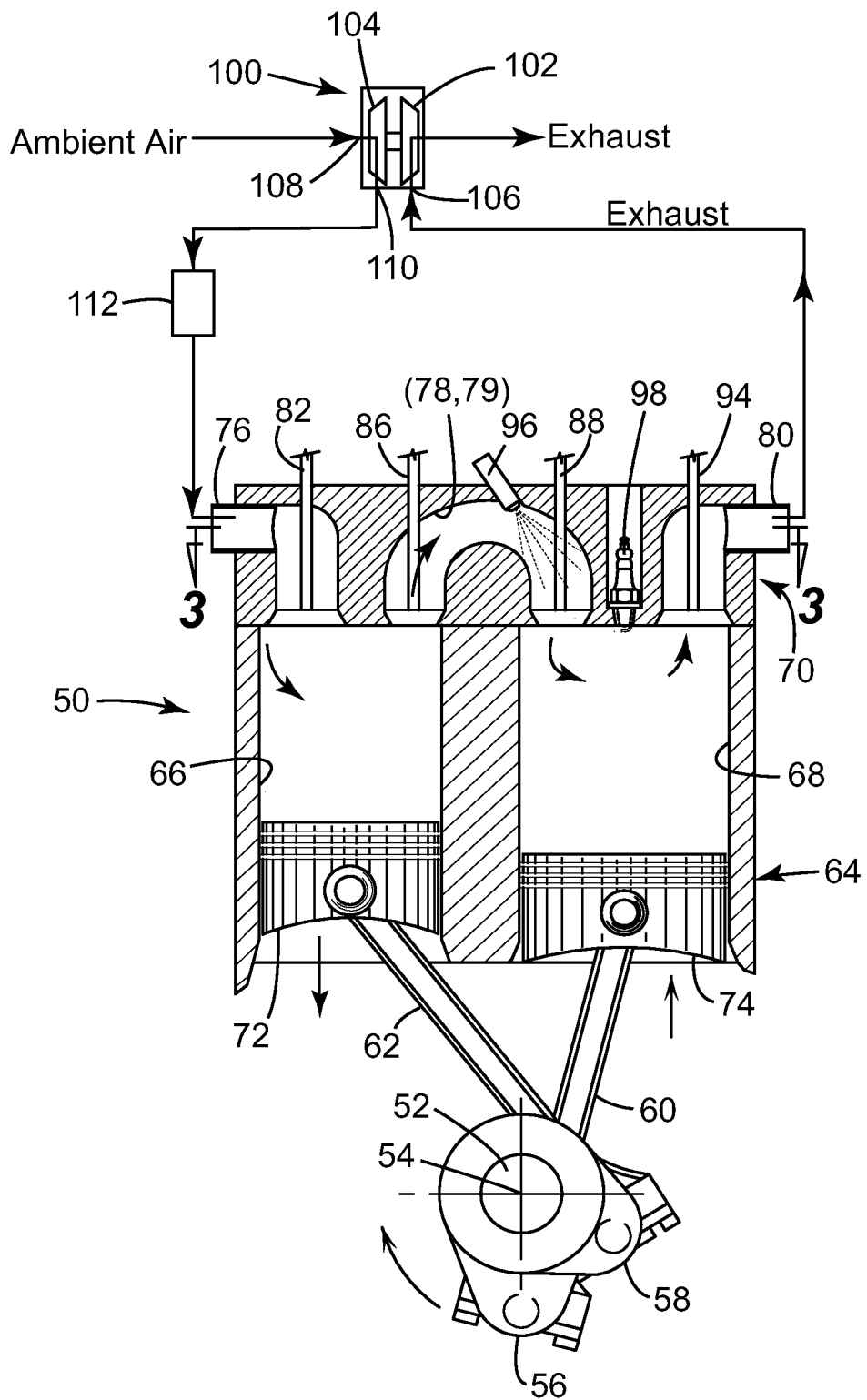
FIG. 3 is a transverse cross-sectional view of an exemplary embodiment of a turbocharged split-cycle engine in accordance with the present invention.
Figure 4:
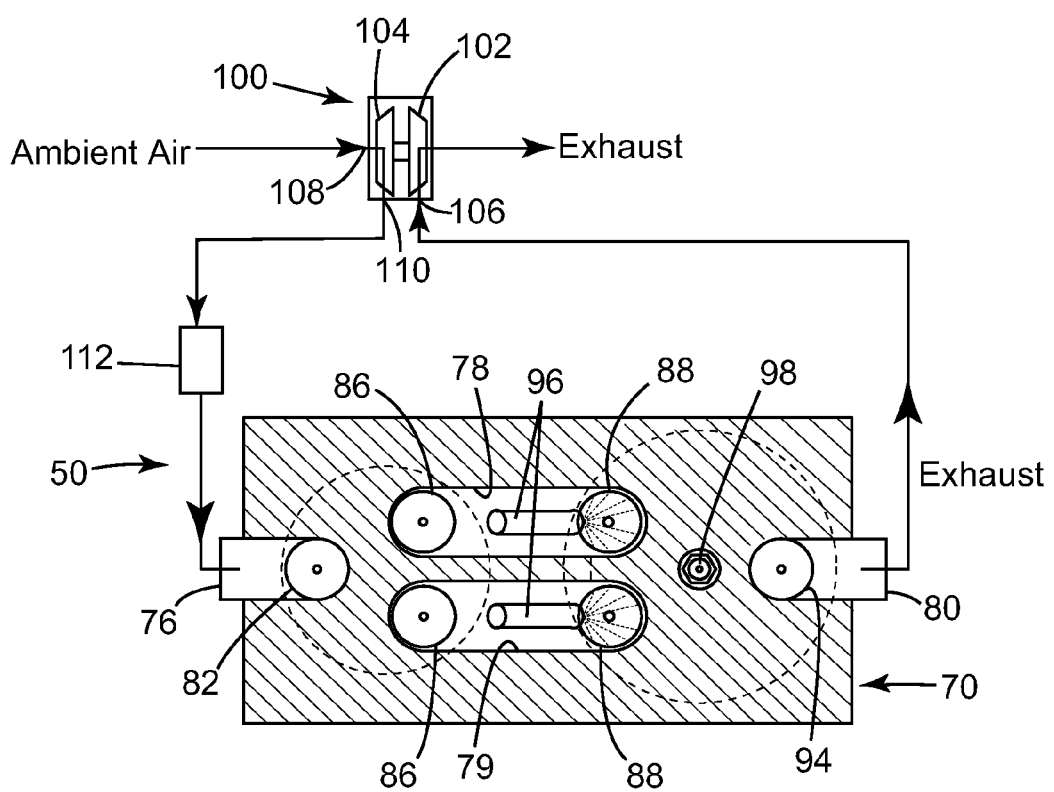
FIG. 4 is a cross-sectional top view of the split-cycle engine taken through line 3-3 of FIG. 2 with fuel injectors superimposed.

Referring now to FIGS. 3 and 4 of the drawings in detail, numeral 50 generally indicates an exemplary embodiment of a split-cycle engine in accordance with the present invention. Engine 50 includes a crankshaft 52 rotatable about a crankshaft axis 54 in a clockwise direction as shown in the drawing. The crankshaft 52 includes adjacent angularly displaced leading and following crank throws 56, 58, connected to connecting rods 60, 62, respectively.

Engine 50 further includes a cylinder block defining a pair of adjacent cylinders, in particular a compression cylinder 66 and an expansion cylinder 68 closed by a cylinder head 70 at one end of the cylinders opposite the crankshaft 52.

A compression piston 72 is received in compression cylinder 66 (thereby defining a compressor (66, 72)) and is connected to the connecting rod 62 for reciprocation of the piston between top dead center (TDC) and bottom dead center (BDC) positions. An expansion piston 74 is received in expansion cylinder 68 (thereby defining an expander (68, 74))

and is connected to the connecting rod 60 for similar TDC/BDC reciprocation. In this embodiment, the expansion piston 74 leads the compression piston 72 by 20 degrees crank angle. In other words, the compression piston 72 reaches its TDC position 20 degrees of crankshaft rotation after the expansion piston 74 reaches its TDC position.

While the embodiment shown in the drawings illustrates a compressor that includes only one compression cylinder connected by a crossover passage to an expander that includes only one expansion cylinder, it should be understood that the compressor may include more than one compression cylinder associated with and connected to the expander, and/or the expander may include more than one expansion cylinder associated with and connected to the compressor. However, for purposes of simplicity, the following description refers to a compressor having a single compression cylinder paired with an expander having a single expansion cylinder.

As explained in more detail below, the displacement volume (Vd) of the compressor is significantly smaller than the displacement volume (Vd) of the expander. More specifically, the displacement of the compressor may be 90 percent, 80 percent, 75 percent, 70 percent or less than the displacement of the expander. Accordingly, the gas is expanded more on the expansion stroke than it is compressed on the compression stroke to enable Miller cycle operation.

The cylinder head 70 provides the structure for gas flow into, out of and between the cylinders 66, 68. In the order of gas flow, the cylinder head includes an intake manifold (or intake port) 76 through which intake air is drawn into the compression cylinder 66, a pair of separate crossover (Xovr) passages (or ports) 78 and 79 through which compressed air is transferred from the compression cylinder 66 to the expansion cylinder 68, and an exhaust port 80 through which spent gases are discharged from the expansion cylinder.

Gas flow into the compression cylinder 66 is controlled by an inwardly opening poppet type intake valve 82. Gas flow into and out of each crossover passage 78 and 79 is controlled by a pair of outwardly opening poppet valves, i.e., crossover compression (XovrC) valves 86 at inlet ends of the Xovr passages 78, 79 and crossover expansion (XovrE) valves 88 at outlet ends of the crossover passages 78, 79. Exhaust gas flow out the exhaust port 80 is controlled by an inwardly opening poppet type exhaust valve 94. These valves 82, 86, 88 and 94 may be actuated in any suitable manner such as by mechanically driven cams, variable valve actuation technology or the like.

Each crossover passage 78, 79 has at least one high pressure fuel injector 96 disposed therein. The fuel injectors 96 are operative to inject fuel into a charge of compressed air within the crossover passages 78, 79.

Engine 50 also includes one or more spark plugs 98 or other ignition devices located at appropriate locations in the expansion cylinder wherein a mixed fuel and air charge may be ignited and burned during the expansion stroke.

The engine 50 also includes a boosting device, such as turbocharger 100, a supercharger, or similar, capable of raising cylinder intake charge pressures up to and beyond 1.7 bar absolute (such as 2 bar absolute, 2.3 bar absolute, 2.5 bar absolute 3 bar absolute or more). In this embodiment, turbocharger 100 includes an exhaust turbine 102 driving a rotary compressor 104. The turbine has an exhaust gas inlet 106 connected to receive pressurized exhaust gas from the exhaust port 80 of the engine 50. The turbine 102 utilizes the waste energy of the exhaust gas to drive the compressor 104, which draws in ambient air at atmospheric pressure through an air inlet 108 and discharges pressurized air through a compressed air outlet 110. The compressed air passes through an intercooler 112 and enters the air intake manifold 76 of the compression cylinder 66 at an absolute pressure boosted above that of atmospheric pressure.

Although the turbocharger 100 is shown as a single stage device coupled with an intercooler, it should be understood that other turbine systems are within the scope of the invention. Thus, the boosting device may include multiple stages of turbocharging, and the device may be coupled with multiple stages of intercooling. Examples of such turbocharger systems include, but are not limited to, two stage systems, parallel sequential systems or modulating series sequential systems. The boosting device is not particularly limited to a specific structure as long as the boosting device is capable of increasing the pressure of the intake air to a certain amount above atmospheric pressure.

In the present split-cycle engine 50, the turbocharger 100 uses waste heat energy (energy that would otherwise be dispensed to the atmosphere) to do the initial work of compression. This reduces the total work required by the compression piston 72 of the engine 50 to reach the same end of compression constraints (e.g., peak cylinder pressure, temperature, knock fraction, or the like) that a naturally aspirated split-cycle engine would achieve for a given charge of air.

Accordingly, while operating the engine 50 within its predetermined constraint (peak cylinder pressure, knock fraction or the like) limits, the greater the boost from the turbocharger system 100 the more the total compression work load can be shifted from the compressor 66, 72 to the turbocharger compressor 104. As a result, the size of the compressor 66 relative to the expander 68 can be progressively reduced with increasing boost pressure without exceeding the engine's operating constraints. This downsizing of the compressor relative to the expander greatly increases the Miller factor (i.e., the ratio of gas expansion during the expansion stroke to gas compression during the compression stroke) and therefore increases brake mean effective pressure (BMEP) and decreases brake specific fuel consumption (BSFC).

Reduction of the compressor displacement relative to the expander displacement allows Miller cycle operation while still closing the intake valve at or near an optimum trapped mass condition (i.e., optimum compressor volumetric efficiency relative to intake manifold conditions of 75%, 80%, 85%, 90% or more). Downsizing the compression cylinder 66 to effect Miller cycle operation results in reduced pumping work compared to a conventional Miller cycle engine, which utilizes early or late intake valve closing to implement the same Miller cycle operation. Reduction in pumping work is due to the avoidance of closing the intake valve 82 during a period of high piston 72 (and therefore air) velocity in the split-cycle engine's 50 operating cycle. By contrast, piston velocity and pumping losses would increase significantly in a conventional engine as the intake valve closes progressively later or earlier (i.e., as compressor volumetric efficiency gets progressively worse) for Miller operation. As a result, the split-cycle engine 50 can achieve more aggressive Miller factor operation and benefits than a conventional engine.

Additionally, downsizing the compressor to achieve Miller operation in a split-cycle engine does not waste part of the compressor's displacement. Contrarily, in order to configure a conventional engine for Miller operation at full load, its cylinders must be sized for the full displacement of its expansion stroke and part of that displacement must necessarily be wasted to accommodate early or late intake valve closing during the compression stroke. As a result, the reduction of the compressor displacement on the split-cycle engine provides a generally higher brake mean effective pressure (BMEP) compared to a conventional engine with Miller cycle operation.

Figure 5:
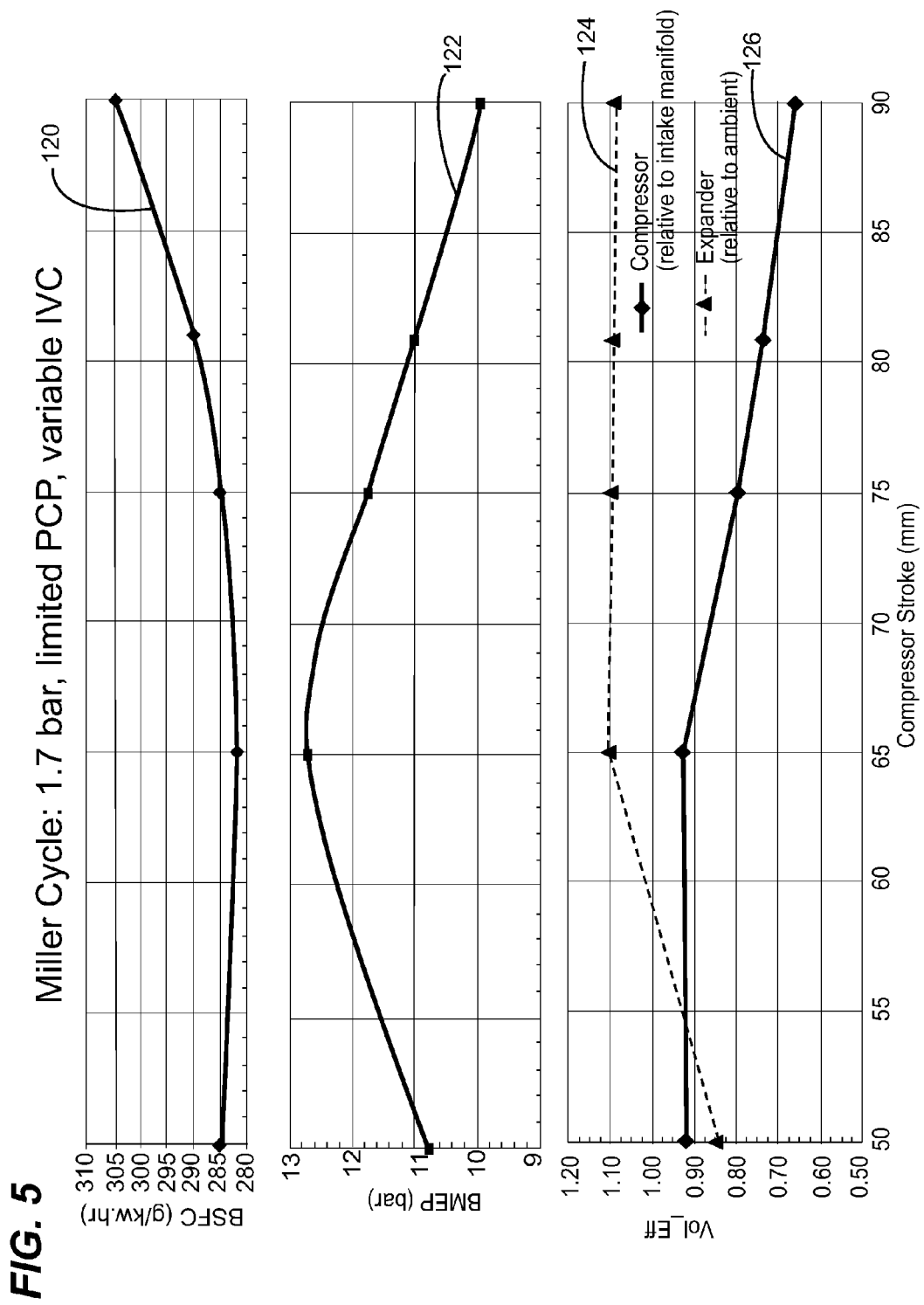
FIG. 5 is a graphical illustration of brake specific fuel consumption (BSFC), brake mean effective pressure (BMEP) and volumetric efficiency (Vol_Eff) as a function of compressor stroke length at a fixed boost of 1.7 bar absolute.

As illustrated in FIG. 5, care must be taken to match the boost to the compressor displacement for optimum performance. Insufficient boost and/or compressor displacement will result in insufficient filling of the expander, as shown towards the left side of FIG. 5. It has been found that when the expander volumetric efficiency becomes undesirably low (i.e., below 0.90 when measured relative to ambient conditions), performance is non-optimum. If the expander volumetric efficiency is too low, it indicates that the compressor did not have enough displacement volume to fill the expander and engine performance will suffer. More particularly, as shown in FIG. 5, for a given boost level, within the operating constraints used by the engine, the split-cycle engine is most efficient when volumetric efficiency of both the compressor and expander are at or near optimum.

In FIG. 5, the turbocharger 100 was set to provide a constant boost of 1.7 bar absolute to the intake manifold 76 of engine 50, and the intake valve closing (IVC) timing was utilized to prevent the constraint of peak cylinder pressure (PCP) of the expansion cylinder 68 from exceeding a predetermined maximum value. Additionally, the compressor (66, 72) and expander (68, 74) were set to have a fixed bore diameter of 87 mm, and the expander was also set to have a fixed stroke length of 87 mm. The compressor stroke length was varied from 50 mm to 90 mm (i.e., the displacement volume of the compressor was varied by changing the size of the stroke length of the compression piston 72).

The top graph 120 of FIG. 5 illustrates brake specific fuel consumption (BSFC) as a function of compressor stroke length. The middle graph 122 of FIG. 5 illustrates brake mean effective pressure (BMEP) as a function of compressor stroke length. The bottom two graphs 124, 126 of FIG. 5 illustrate volumetric efficiency as a function of compressor stroke length, wherein the compressor volumetric efficiency 126 is referenced relative to intake manifold conditions and the expander volumetric efficiency 124 is referenced relative to ambient conditions.

At a 50 mm compressor stroke length, the compressor (66, 72) displacement volume is only 57 percent (i.e., 50 mm/87 mm=0.57) of the expander (68, 74) displacement volume. At this downsized compressor displacement volume, the intake valve 82 can be operated to provide maximum volumetric efficiency while the engine 50 continues to operate well below the peak pressure limit of the expander cylinder 68. That is, intake valve 82 is timed to close at an optimum (or maximum) trapped mass condition, wherein the compressor volumetric efficiency is approximately 0.92 when referenced to intake manifold 76 conditions (the theoretical volumetric efficiency limit being 1.00).

However, at a 50 mm stroke, even when operating at a maximum volumetric efficiency of 0.92, the compressor is sized too small to sufficiently fill the expander at this boost level. As a result, the volumetric efficiency of the expander is unacceptably low, having a value of 0.85 when referenced to ambient conditions (wherein an expander volumetric efficiency of less than 0.90 is considered undesirable). Accordingly and undesirably, BMEP drops to about 10.8 bar (graph 122) and BSFC rises to about 285 g/kw-hr (graph 120).

Referring to FIG. 5, as compressor stroke length increases from 50 to 65 mm, intake valve 82 continues to close at optimum trapped mass conditions and the compressor continues to operate at a maximum volumetric efficiency of 0.92. Additionally, as the compressor stroke increases from 50 to 65 mm, the expander volumetric efficiency increases from 0.85 to 1.10 as the expander receives greater amounts of charged air from the compressor. The peak pressure of the expansion cylinder 68 continuously rises as the expander volumetric efficiency increases until the predetermined limit of peak pressure is reached when the expander volumetric efficiency reaches 1.10.

At a compressor stroke length of 65 mm, the compressor displacement volume is 75 percent (i.e., 65 mm/87 mm=0.75) of the expander displacement volume. At this ratio of compressor to expander volume, the engine 50 operating conditions are as follows:

1) Boost Pressure is 1.7 bar absolute;
2) Compressor volumetric efficiency is maximized at 0.92 relative to intake manifold conditions;
3) Expander volumetric efficiency is maximized at 1.10 relative to ambient conditions; and
4) Expander peak pressure is at its predetermined maximum limit.

Essentially, for the given boost level of 1.7 bar absolute, while operating within the predetermined peak expansion cylinder pressure limit, the intake valve 82 has been timed to provide an optimum compressor volumetric efficiency of 0.92 relative to intake manifold conditions, and the compressor displacement volume has been sized to be 75 percent of the expander displacement volume to provide a maximum expander volumetric efficiency of 1.10 relative to ambient conditions. Under these optimized parameters, Miller cycle operation is most beneficial and the engine 50 operates at a peak BMEP of 12.8 bar and a minimum BSFC of 282 g/kw-hr.

It should be noted that the split-cycle engine 50 (and split-cycle engines in general) can function with less than ideal operating parameters and still derive significant benefits from Miller cycle operation. However, for the benefits of Miller cycle operation to have practical significance on a split-cycle engine the following threshold engine operating parameters should be met or exceeded:

1) The boosting device is operable to provide a 1.7 bar absolute or greater boost pressure level to the intake manifold;
2) The intake valve closing event is timed to provide a compressor volumetric efficiency relative to intake manifold conditions of 0.75 or greater; and
3) The compressor displacement volume is sized relative to the expander displacement volume such that the combination of compressor displacement volume and boost pressure level provides an expander volumetric efficiency relative to ambient conditions that is 0.90 or greater.

It should also be noted that the expander volumetric efficiency is dependent primarily upon two parameters, the boost pressure level to the intake manifold and the compressor displacement volume relative to the expander displacement volume. It is primarily the combination of boost pressure level and compressor displacement that provides the proper air mass to fill the expander and attain the required expander volumetric efficiency.

Referring again to FIG. 5, for compressor strokes greater than 65 mm, the compressor becomes too large relative to the expander to maintain the maximum compressor volumetric efficiency of 0.92 without exceeding the predetermined peak expansion cylinder pressure. Accordingly, the intake valve 82 must be closed progressively either earlier or later as compressor stroke increases to sacrifice compressor volumetric efficiency in order to maintain expander volumetric efficiency and to prevent the expansion cylinder peak pressure from exceeding its limit. As a result, both BSFC and BMEP suffer. For example, at a compressor stroke length of 90 mm, the BSFC has risen from 282 g/kw-hr to a maximum value 305 g/kw-hr, and the BMEP has fallen from 12.8 bar to a minimum of 10 bar.

Figure 6:
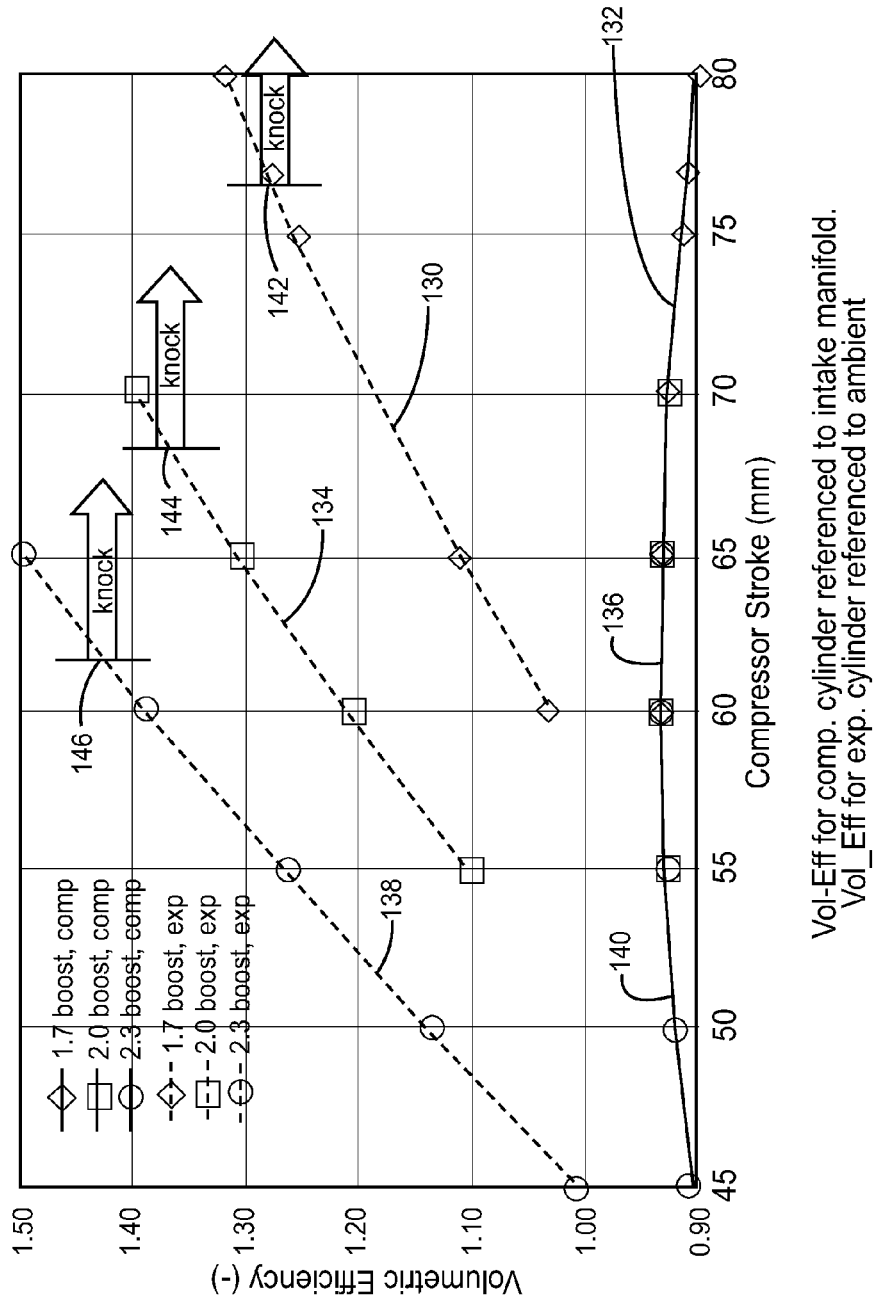
FIG. 6 is a graphical illustration of volumetric efficiency of the compressor and the expander of a split-cycle engine as a function of compressor stroke length at boost levels of 1.7 bar absolute, 2.0 bar absolute, and 2.3 bar absolute, at full engine load and an engine speed of 4000 rpm.

FIG. 6 illustrates the volumetric efficiency characteristics of a gasoline fueled split-cycle engine 50 while operating the Miller cycle at 4000 RPM and full load conditions for various boost levels. The limiting constraint in this case was chosen to be knock fraction, which, for a gasoline engine, is typically exceeded before peak expander cylinder pressure is exceeded. As before, the compressor (66, 72) and expander (68, 74) of engine 50 were set to have a fixed bore diameter of 87 mm, and the expander was also set to have a fixed stroke length of 87 mm. Accordingly, the displacement volume of the compressor was varied by changing the size of the stroke length of the compression piston 72.

It is important to note that, unlike the case illustrated in FIG. 5, the intake valve closing (IVC) timing of intake valve 82 was not varied. Rather, the IVC timing was fixed at its optimum trapped mass condition to maximize volumetric compressor efficiency at 0.90 or greater regardless of boost level or compressor displacement.

Referring to FIG. 6, three pairs of compressor and expander volumetric efficiency graphs versus compressor stroke length are plotted. Each compressor volumetric efficiency graph 132, 136, 140 is referenced to intake manifold conditions and each expander volumetric efficiency graph 130, 134, 138 is referenced to ambient conditions. Graphs 132 and 130 illustrate the volumetric efficiencies of compressor (66, 72) and expander (68, 74) respectively, for a boost level of 1.7 bar absolute, over a compressor stroke range of 60 mm to 80 mm. Graphs 136 and 134 illustrate the volumetric efficiencies of compressor (66, 72) and expander (68, 74) respectively, for a boost level of 2.0 bar absolute, over a compressor stroke range of 55 mm to 70 mm. Graphs 140 and 138 illustrate the volumetric efficiencies of compressor (66, 72) and expander (68, 74) respectively, for a boost level of 2.3 bar absolute, over a compressor stroke range of 45 mm to 65 mm.

In each of the above cases, the compressor stroke was swept until the identical predetermined knock fraction limit (142, 144 and 146) was reached for each boost level, i.e., 1.7, 2.0 and 2.3 bar absolute. For 1.7 bar boost, the knock fraction limit 142 was reached at a compressor stroke length of approximately 77 mm and an expander volumetric efficiency of approximately 1.28. For 2.0 bar boost, the knock fraction limit 144 was reached at a compressor stroke length of approximately 68 mm and an expander volumetric efficiency of approximately 1.37. For 2.3 bar boost, the knock fraction limit 146 was reached at a compressor stroke length of approximately mm and an expander volumetric efficiency of approximately 1.43.

The following three important characteristics of gasoline split-cycle engine 50 can be derived from the family of graphs (130, 132, 134, 136, 138 and 140) illustrated in FIG. 6:
1) When operating intake valve closing at maximum trapped mass conditions, the volumetric efficiency of the compressor (132, 136 and 140) remains essentially constant regardless of boost level or compressor size.
2) For an identical knock fraction limit (142, 144 and 146), as boost level increases (from 1.7 to 2.0 to 2.3 bar absolute) the compressor size decreases respectively (from 77 mm to 68 mm to 62 mm).
3) For an identical knock fraction limit (142, 144, and 146) the volumetric efficiency of the expander (130, 134 and 138) increases (from 1.28 to 1.37 to 1.43) even though compressor size is decreasing with increasing boost. As a result, since expander volumetric efficiency is increasing, the mass air and fuel flow must also increase and, therefore, specific power also increases.

Figure 7:
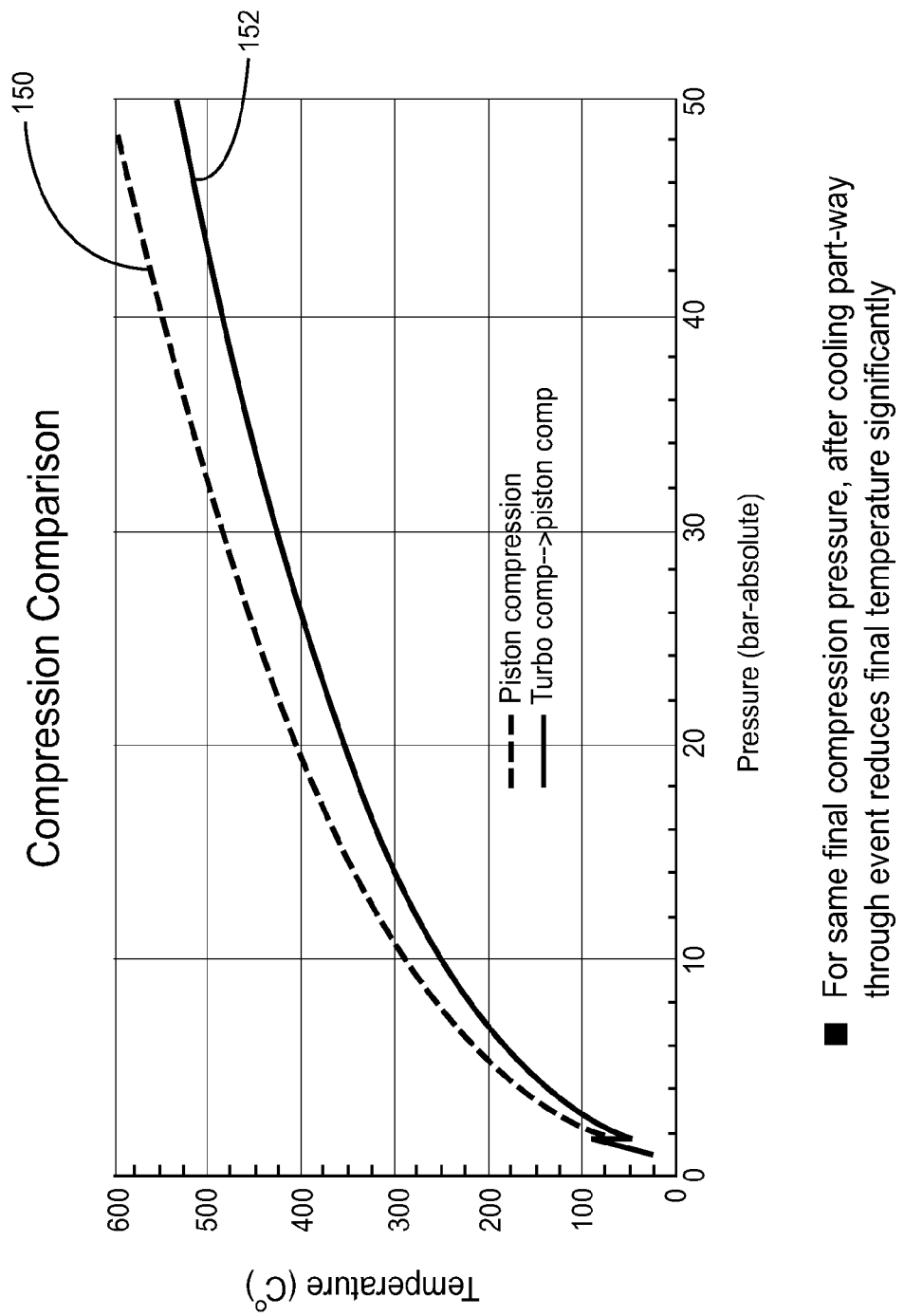
FIG. 7 is a graphical illustration of a comparison of temperature and pressure for piston compression versus temperature and pressure for turbo compression followed by piston compression.

Referring to FIG. 7, a temperature versus compression comparison illustrates another advantage of the present split-cycle engine utilizing Miller operation. Graph 150 illustrates temperature versus compression pressure within the compression cylinder of a split-cycle engine having a pure piston compression arrangement (i.e., naturally aspirated, no Miller operation, and no turbocharger). Graph 152 illustrates temperature versus compression pressure for the compression cylinder of a split-cycle engine having an arrangement of turbocharging and intercooling prior to piston compression (i.e, Miller operation). The turbocharged/intercooled graph 152 results in a significantly lower final temperature for the same end of compression pressure compared to that of the pure piston compression graph 150. For example, at an end of compression pressure of 40 bar absolute, the temperature within the compression cylinder for the turbocharged/intercooled arrangement, as shown in graph 152, is approximately 475 degrees centigrade, while the temperature within the compression cylinder of the pure piston compression arrangement, as shown in graph 150, is approximately 550 degrees centigrade.

This lower temperature advantage is generally true for any turbocharged/intercooled Miller cycle engine, whether it be conventional or split-cycle. However, the previously mentioned split-cycle engine's ability to utilize more aggressive Miller factor operation than conventional engines allows the split-cycle engine to intercool later in the overall compression process than a conventional engine, resulting in a lower end-of-compression temperature than that of a conventional Miller cycle engine for the same pressure.

Figure 8:
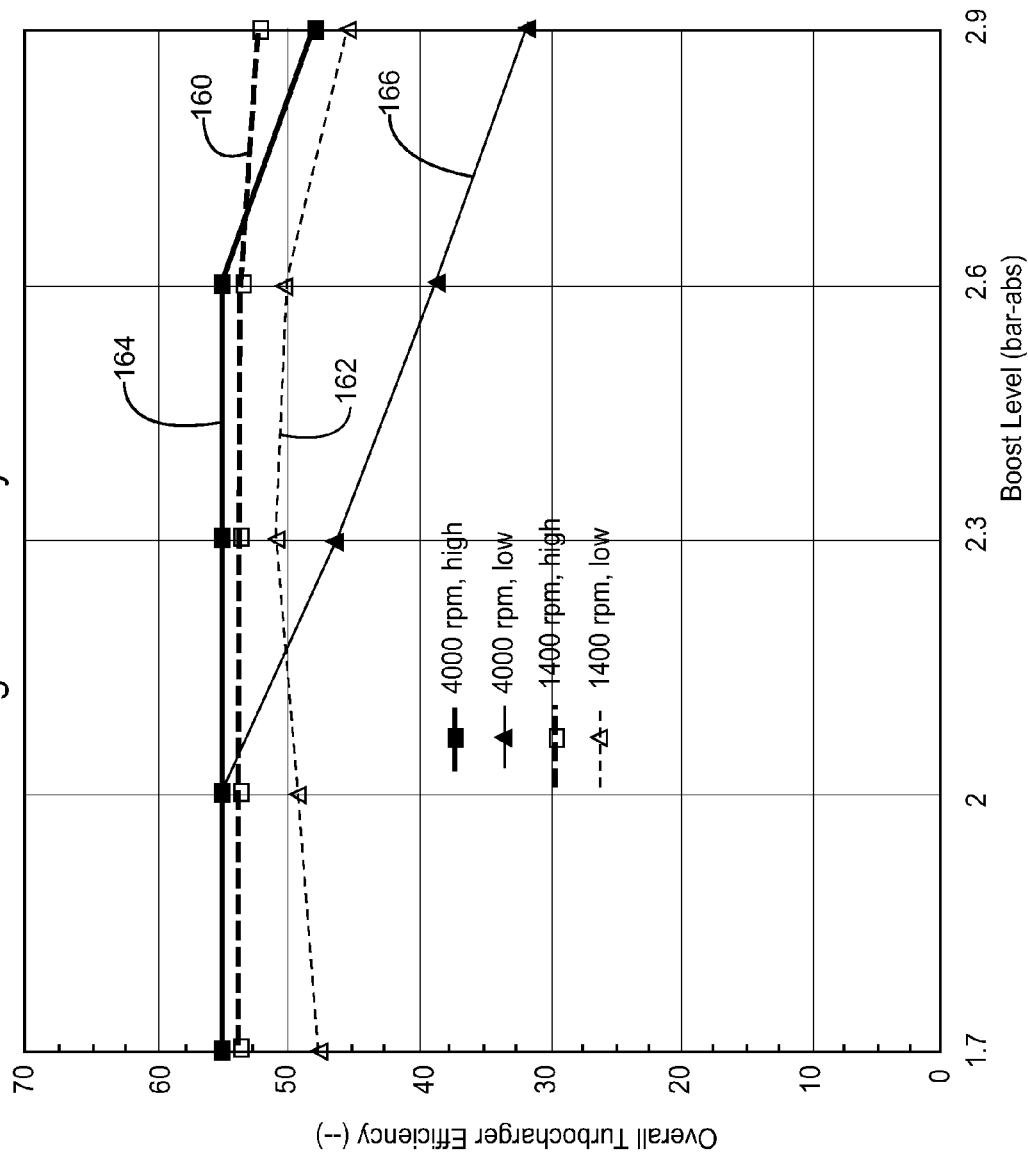
FIG. 8 is a graphical illustration of overall turbocharger efficiency assumptions as a function of boost level for high and low efficiency turbochargers at engine speeds of 1400 rpm (low speed) and 4000 rpm (high speed)
Figure 9:
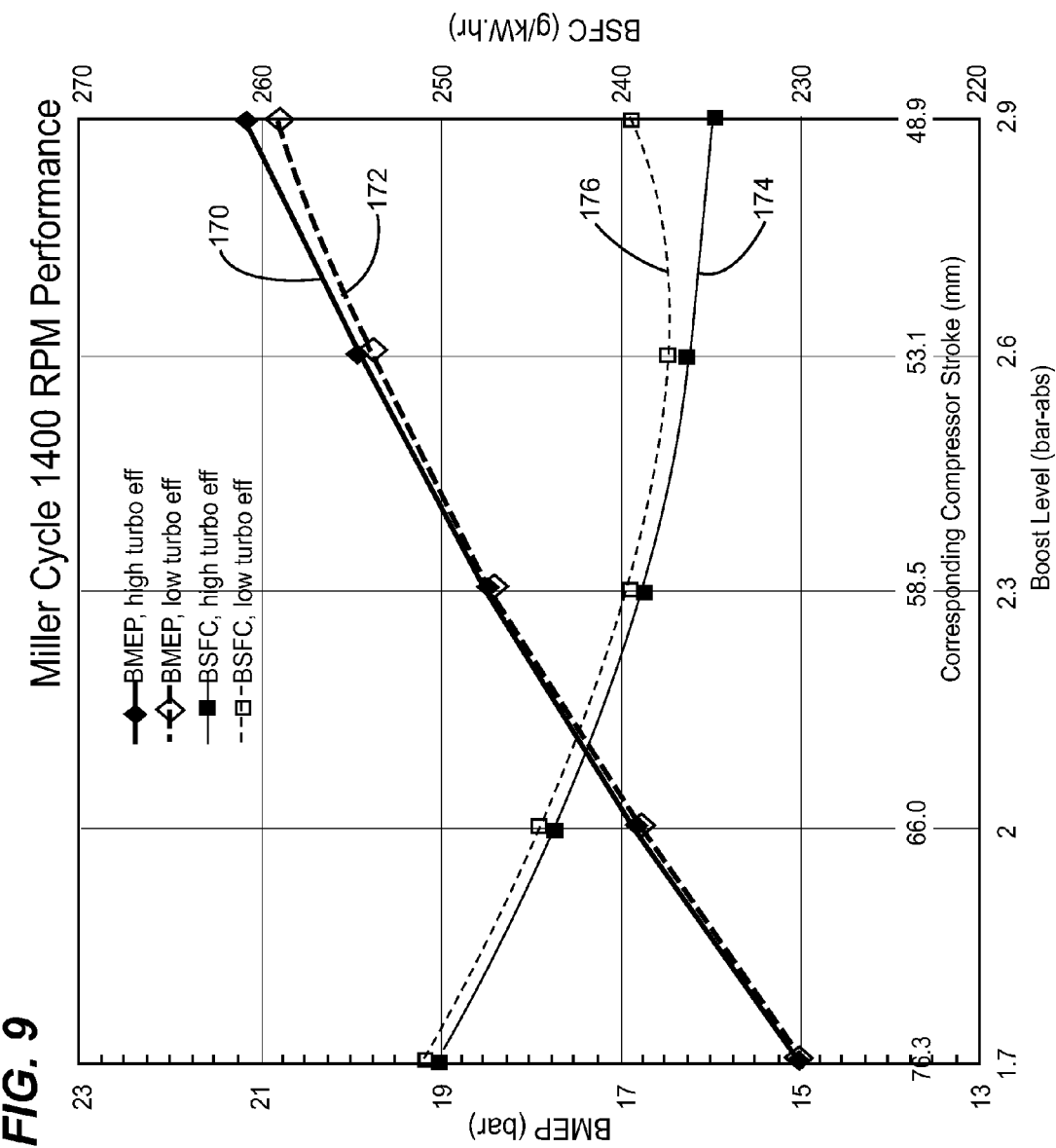
FIG. 9 is a graphical illustration of brake mean effective pressure (BMEP) and brake specific fuel consumption (BSFC) as a function of boost level (and corresponding compressor stroke length) for the low efficiency turbocharger and the high efficiency turbocharger of FIG. 8 at an engine speed of 1400 rpm.
Figure 10:
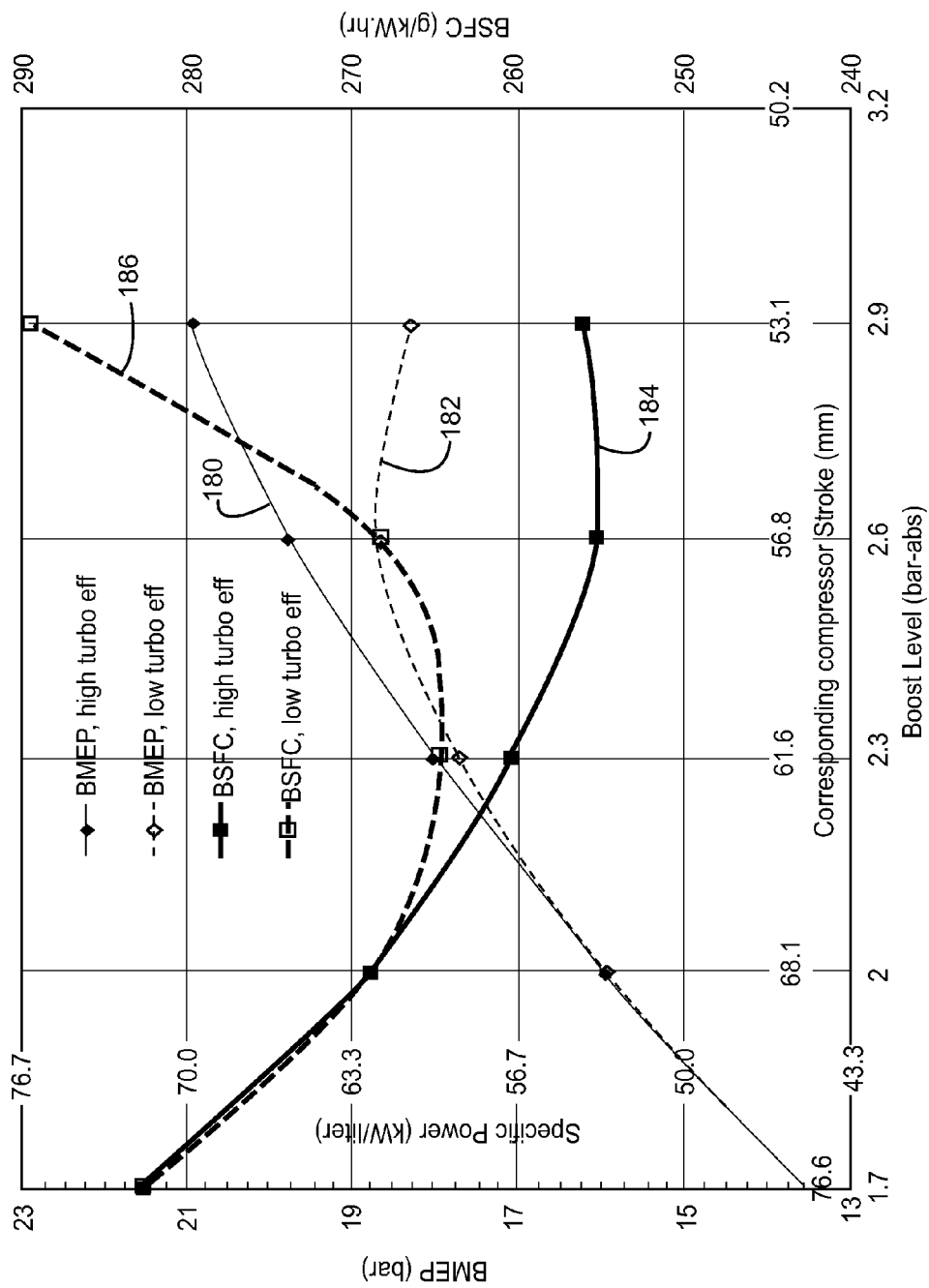
FIG. 10 is a graphical illustration of brake mean effective pressure (BMEP) and brake specific fuel consumption (BSFC) as a function of boost level (and corresponding compressor stroke length) for the low efficiency turbocharger and the high efficiency turbocharger of FIG. 8 at an engine speed of 4000 rpm.

FIGS. 8-10 illustrate the effect of turbocharger efficiency on the performance gains of the Miller cycle in the present split-cycle engine 50. FIG. 8 depicts representative values of overall turbocharger efficiency as a function of boost level for a low and high efficiency turbocharger system at the two engine speeds of 1400 RPM and 4000 RPM. These turbocharger efficiency estimates were used in the following cycle analysis of the Miller split-cycle engine. More particularly, graph 160 represents optimistic overall turbocharger efficiency estimates at 1400 RPM and graph 162 represents pessimistic overall turbocharger efficiency estimates at 1400 RPM. Additionally, graph 164 represents optimistic overall turbocharger efficiency estimates at 4000 RPM and graph 166 represents pessimistic overall turbocharger efficiency estimates at 4000 RPM.

Although every turbocharger system is unique, it can generally be said that overall turbocharger efficiencies of turbocharger systems at lower speeds (such as 1400 RPM) do not diverge as much as the overall turbocharger efficiencies of those same turbocharger systems at higher engine speeds (such as 4000 RPM). This is illustrated in FIG. 8 wherein the overall efficiencies at 1400 RPM stay relatively close in value over the entire boost range of 1.7 bar boost to 2.9 bar boost for both the high estimated efficiency turbocharger graph 160 and low estimated efficiency turbocharger graph 162. For example, the efficiencies vary between approximately 47 and 53 for a 1.7 bar boost in graphs 162 and 160 respectively, and the efficiencies vary between approximately 46 and for a 2.9 bar boost in graphs 162 and 160 respectively.

In contrast, the overall turbocharger efficiencies at 4000 RPM have a pronounced divergence over the boost range between the high estimated efficiency case graph 164 and the low estimated efficiency case graph 166. For example, the efficiencies between 1.7 bar and 2.0 bar boost in graphs 166 and 164 are virtually identical. However, beyond 2.0 bar boost, the graphs 166 and 164 diverge substantially until, when they reach 2.9 bar boost, the overall efficiency for the high estimated efficiency turbocharger is about 48 (graph 164) while the overall efficiency of the low estimated efficiency turbocharger is about 32. These overall turbocharger efficiencies and their respective divergence have a profound effect on engine performance in a turbocharged Miller split-cycle engine such as engine 50 as shown in FIGS. 9 and 10.

FIG. 9 depicts engine performance (in terms of BMEP and BSFC) at low engine speed (1400 rpm) and at full load over the same range of boost levels for both the high efficiency and the low efficiency turbochargers exemplified in FIG. 8. The compressor stroke length (i.e., compressor size), required in combination with the corresponding boost level to maintain a fixed knock fraction, is also shown overlaying the x-axis. More particularly, graph 170 illustrates BMEP for the high efficiency turbocharger at 1400 RPM and graph 172 illustrates BMEP for the low efficiency turbocharger at 1400 RPM. Additionally, graph 174 illustrates BSFC for the high efficiency turbocharger at 1400 RPM and graph 176 illustrates BSFC for the low efficiency turbocharger at 1400 RPM. As can be seen, since the overall turbocharger efficiencies at 1400 RPM of both the high efficiency turbocharger and low efficiency turbocharger track each other fairly closely over the boost range of 1.7 bar boost to 2.9 bar boost (as illustrated in graphs 160 and 162 of FIG. 8), so too do the BSFC curves 174, 176 and BMEP curves 170, 172 of FIG. 9.

FIG. 10 depicts engine performance (in terms of BMEP and BSFC) at high engine speed (4000 RPM) and at full load over the same range of boost levels for both the high efficiency and the low efficiency turbochargers exemplified in FIG. 8. The compressor stroke length (i.e., compressor size), required in combination with the corresponding boost level to maintain a fixed knock fraction, is also shown overlaying the x-axis. More particularly, graph 180 illustrates BMEP for the high efficiency turbocharger at 4000 RPM and graph 182 illustrates BMEP for the low efficiency turbocharger at 4000 RPM. Additionally, graph 184 illustrates BSFC for the high efficiency turbocharger at 4000 RPM and graph 186 illustrates BSFC for the low efficiency turbocharger at 4000 RPM.

Within the range of 1.7 to 2.0 bar boost, the overall turbocharger efficiencies at 4000 RPM of both the high efficiency turbocharger and low efficiency turbocharger track each other fairly closely (as illustrated in graphs 164 and 166 of FIG. 8). As a result, the BSFC curves 184, 186 and BMEP curves 180, 182 of FIG. 9 also track each other fairly closely over that same boost range of 1.7 to 2.0 bar.

However, at higher boost levels of 2.0 bar to 2.9 bar, the overall turbocharger efficiencies at 4000 RPM of both the high efficiency turbocharger and low efficiency turbocharger diverge rapidly (again as illustrated in graphs 164 and 166 of FIG. 8). Accordingly, the associated BSFC curves 184, 186 and BMEP curves 180, 182 also diverge rapidly over that same boost range of 2.0 to 2.9 bar.

A further comparison of FIGS. 9 and 10 reveals that an acceptable tradeoff for compressor stroke length at low and high engine speed operation is approximately 55 mm. Based on the fixed expander stroke length of 87 mm, the displacement volume of the compressor is about 63% of the displacement volume of the expander (i.e., 55 mm/87 mm=0.63).

Figure 11:
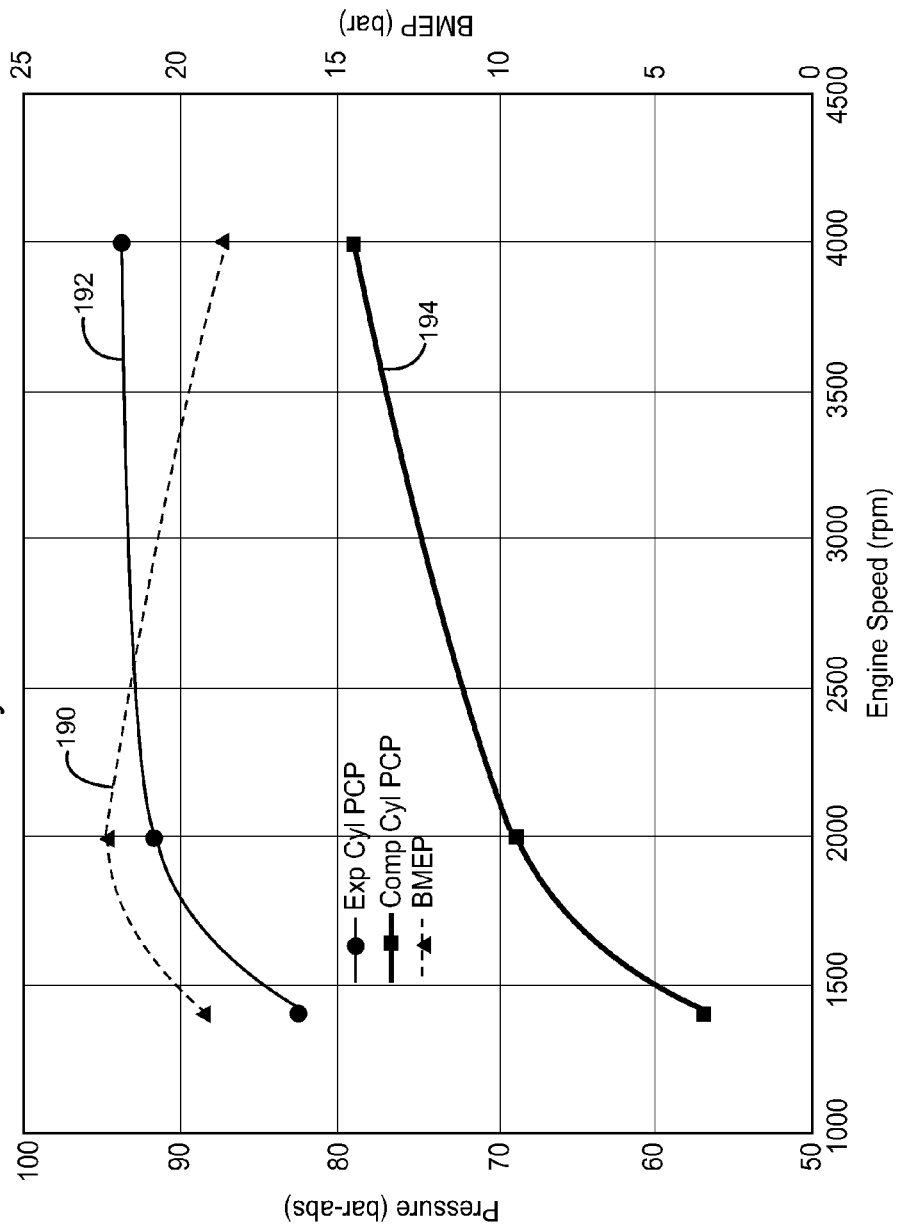
FIG. 11 is a graphical illustration of brake mean effective pressure (BMEP), compression cylinder peak pressure, and expansion cylinder peak pressure as a function of engine speed at a boost of less than 3 bar absolute and at full engine load.

Turning to FIG. 11, engine 50 is sized for a compressor having a stroke length of 55 mm and an expander having a stroke length of 87 mm. The bore diameters of both compressor and expander were fixed at 87 mm. Engine speed was varied from 1400 to 4000 rpm at full load and a turbo boost of 3 bar absolute or less was applied. The overall efficiency of the turbocharger system was assumed to be that of the low efficiency turbocharger system of FIG. 8 (i.e., graphs 162 at 1400 RPM and graph 166 at 4000 RPM).

Accordingly in FIG. 11, graph 190 is the full load BMEP for this embodiment of engine 50 over the entire speed range of 1400 to 4000 RPM. Graph 192 illustrates the peak expansion cylinder pressure over the entire speed range in bar-absolute (read from left y-axis). Graph 194 represents the peak compression cylinder pressure over the entire speed range in bar-absolute (also read from the left y-axis). The resulting peak compression cylinder 66 pressure and peak expansion cylinder 68 pressure, which generally increase with engine speed and BMEP, are low due to an aggressive Miller factor, which provides increased BMEP due to reduced compression work instead of increased expansion work as most performance improvement schemes provide. By way of example, at an engine speed of 4000 RPM and an engine BMEP of approximately 19 bar, the peak expansion cylinder pressure is approximately 94 bar-absolute and the peak compression cylinder pressure is approximately 79 bar-absolute.

In general, the lower the peak cylinder pressures, the more advantageous it is for engine performance and weight. Accordingly, for a gasoline split-cycle engine having an engine speed of 3500 RPM or greater and an engine BMEP of 15 bar or greater, it is desirable to have the peak expansion cylinder pressure be less than 120 bar, more desirable to have the peak expansion cylinder pressure be less than 110 bar, and most desirable to have the peak expansion cylinder pressure be less than 100 bar. Additionally, for a gasoline split-cycle engine having an engine speed of 3500 RPM or greater and an engine BMEP of 15 bar or greater, it is desirable to have the peak compression cylinder pressure be less than 100 bar, more desirable to have the peak compression cylinder pressure be less than 90 bar, and most desirable to have the peak compression cylinder pressure be less than 80 bar.

The invention and the embodiments of the invention described herein are not fuel specific. One skilled in the art would recognize that the invention may be utilized with any fuel appropriate for any reciprocating internal combustion engine application (e.g., gasoline, diesel, natural gas or the like).

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A split-cycle engine comprising:
a crankshaft rotatable about a crankshaft axis;
an expander having an expander displacement volume, the expander including an expansion piston slidably received within an expansion cylinder and operatively connected to the crankshaft such that the expansion piston reciprocates through an expansion stroke and an exhaust stroke during a single rotation of the crankshaft;
a compressor having a compressor displacement volume that is 90 percent or less than the expander displacement volume, the compressor including a compression piston slidably received within a compression cylinder and operatively connected to the crankshaft such that the compression piston reciprocates through an intake stroke and a compression stroke during a single rotation of the crankshaft;

a crossover passage interconnecting the compression cylinder and the expansion cylinder, the crossover passage including at least a crossover expansion valve disposed therein;

an intake manifold connected to the compression cylinder;

a boosting device connected to the intake manifold and operable to provide a 1.7 bar absolute or greater boost pressure level to the intake manifold;

an intake valve disposed between the intake manifold and the compression cylinder and operable to control fluid communication therebetween, the intake valve having an intake valve closing event which is timed to provide a compressor volumetric efficiency relative to intake manifold conditions of 0.75 or greater; and the compressor displacement volume being sized relative to the expander displacement volume such that the combination of compressor displacement volume and boost pressure level provide an expander volumetric efficiency relative to ambient conditions that is 0.90 or greater.

2. The split-cycle engine of claim 1, wherein the compressor has a compressor displacement volume that is 80 percent or less than the expander displacement volume.

3. The split-cycle engine of claim 1, wherein the compressor has a compressor displacement volume that is 75 percent or less than the expander displacement volume.

4. The split-cycle engine of claim 1, wherein the compressor has a compressor displacement volume that is 70 percent or less than the expander displacement volume.

5. The split-cycle engine of claim 1, wherein the boosting device is operable to provide a 2.0 bar absolute or greater boost pressure level to the intake manifold.

6. The split-cycle engine of claim 1, wherein the boosting device is operable to provide a 2.3 bar absolute or greater boost pressure level to the intake manifold.

7. The split-cycle engine of claim 1, wherein the boosting device is operable to provide a 2.5 bar absolute or greater boost pressure level to the intake manifold.

8. The split-cycle engine of claim 1, wherein the intake valve closing event is timed to provide a compressor volumetric efficiency relative to intake manifold conditions of 0.80 or greater.

9. The split-cycle engine of claim 1, wherein the intake valve closing event is timed to provide a compressor volumetric efficiency relative to intake manifold conditions of 0.85 or greater.

10. The split-cycle engine of claim 1, wherein the intake valve closing event is timed to provide a compressor volumetric efficiency relative to intake manifold conditions of 0.90 or greater.

11. The split-cycle engine of claim 1, wherein the compressor displacement volume is sized relative to the expander displacement volume such that the combination of compressor displacement volume and boost pressure level provide an expander volumetric efficiency relative to ambient conditions that is 1.0 or greater.

12. The split-cycle engine of claim 1, wherein the compressor displacement volume is sized relative to the expander displacement volume such that the combination of compressor displacement volume and boost pressure level provide an expander volumetric efficiency relative to ambient conditions that is 1.1 or greater.

13. The split-cycle engine of claim 1, wherein the compressor displacement volume is sized relative to the expander displacement volume such that the combination of compressor displacement volume and boost pressure level provide an expander volumetric efficiency relative to ambient conditions that is 1.2 or greater.

14. The split-cycle engine of claim 1, wherein:

the boosting device is operable to provide a 2.0 bar absolute or greater boost pressure level to the intake manifold;

the intake valve closing event is timed to provide a compressor volumetric efficiency relative to intake manifold conditions of 0.80 or greater; and the compressor displacement volume is sized relative to the expander displacement volume such that the combination of compressor displacement volume and boost pressure level provide an expander volumetric efficiency relative to ambient conditions that is 1.0 or greater.

15. The split-cycle engine of claim 1, wherein:

the boosting device is operable to provide a 2.3 bar absolute or greater boost pressure level to the intake manifold;

the intake valve closing event is timed to provide a compressor volumetric efficiency relative to intake manifold conditions of 0.85 or greater; and the compressor displacement volume is sized relative to the expander displacement volume such that the combination of compressor displacement volume and boost pressure level provide an expander volumetric efficiency relative to ambient conditions that is 1.1 or greater.

16. The split-cycle engine of claim 1, wherein the boosting device is a turbocharger.

17. The split-cycle engine of claim 1, wherein the compressor includes a plurality of compression cylinders.

18. The split-cycle engine of claim 1, wherein the expander includes a plurality of expansion cylinders.

19. The split-cycle engine of claim 1, including a crossover compression valve disposed in the crossover passage, the crossover compression valve and the crossover expansion valve forming a pressure chamber therebetween.

20. A method of operating a split-cycle engine, the engine including:

a crankshaft rotatable about a crankshaft axis;

an expander having an expander displacement volume, the expander including an expansion piston slidably received within an expansion cylinder and operatively connected to the crankshaft such that the expansion piston reciprocates through an expansion stroke and an exhaust stroke during a single rotation of the crankshaft;

a compressor having a compressor displacement volume, the compressor including a compression piston slidably received within a compression cylinder and operatively connected to the crankshaft such that the compression piston reciprocates through an intake stroke and a compression stroke during a single rotation of the crankshaft;

a crossover passage interconnecting the compression cylinder and the expansion cylinder, the crossover passage including at least a crossover expansion valve disposed therein;

an intake manifold connected to the compression cylinder;

a boosting device connected to the intake manifold and operable to provide a boost pressure level to the intake manifold; and an intake valve disposed between the intake manifold and the compression cylinder and operable to control fluid communication therebetween;

the method including the steps of:

sizing the compressor displacement volume to be 90 percent or less than the expander displacement volume;

delivering a 1.7 bar absolute or greater boost pressure level to the intake manifold from the boosting device;

timing the closing of the intake valve such that a compressor volumetric efficiency relative to intake manifold conditions is 0.75 or greater; and sizing the compressor displacement volume relative to the expander displacement volume such that the combination of compressor displacement and boost pressure level provide an expander volumetric efficiency relative to ambient conditions of 0.90 or greater.

21. The method of claim 20, including the step of:
sizing the compressor displacement volume to be 80 percent or less than the expander displacement volume.

22. The method of claim 20, including the step of:
sizing the compressor displacement volume to be 75 percent or less than the expander displacement volume.

23. The method of claim 20, including the step of:
sizing the compressor displacement volume to be 70 percent or less than the expander displacement volume.

24. The method of claim 20, including the step of:
delivering a 2.0 bar absolute or greater boost pressure level to the intake manifold from the boosting device.

25. The method of claim 20, including the step of:
delivering a 2.3 bar absolute or greater boost pressure level to the intake manifold from the boosting device.

26. The method of claim 20, including the step of:
delivering a 2.5 bar absolute or greater boost pressure level to the intake manifold from the boosting device.

27. The method of claim 20, including the step of:
timing the closing of the intake valve such that the compressor volumetric efficiency relative to intake manifold conditions is 0.80 or greater.

28. The method of claim 20, including the step of:
timing the closing of the intake valve such that the compressor volumetric efficiency relative to intake manifold conditions is 0.85 or greater.

29. The method of claim 20, including the step of:
timing the closing of the intake valve such that the compressor volumetric efficiency relative to intake manifold conditions is 0.90 or greater.

30. The method of claim 20, including the step of:
sizing the compressor displacement volume relative to the expander displacement volume such that the combination of compressor displacement and boost pressure level provide an expander volumetric efficiency relative to ambient conditions of 1.0 or greater.

31. The method of claim 20, including the step of:
sizing the compressor displacement volume relative to the expander displacement volume such that the combination of compressor displacement and boost pressure level provide an expander volumetric efficiency relative to ambient conditions of 1.1 or greater.

32. The method of claim 20, including the step of:
sizing the compressor displacement volume relative to the expander displacement volume such that the combination of compressor displacement and boost pressure level provide an expander volumetric efficiency relative to ambient conditions is 1.2 or greater.

* * * * *